(12) United States Patent
Kain (10) Patent No.: US 12,481,756 B2
(45) Date of Patent: Nov. 25, 2025

(54) SYSTEM AND METHOD FOR FILE INTEGRITY WITH FILE-BASED ATTRIBUTES

(71) Applicant: Unisys Corporation, Blue Bell, PA (US)

(72) Inventor: Michael T Kain, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 140 days.

(21) Appl. No.: 18/229,734

(22) Filed: Aug. 3, 2023

(65) Prior Publication Data

US 2025/0045392 A1 Feb. 6, 2025

(51) Int. Cl.
*G06F 21/56* (2013.01)
*G06F 21/33* (2013.01)
*G06F 21/64* (2013.01)

(52) U.S. Cl.
CPC ............ *G06F 21/565* (2013.01); *G06F 21/33* (2013.01); *G06F 21/64* (2013.01)

(58) Field of Classification Search
USPC ..................................................... 726/22
See application file for complete search history.

(56) References Cited

U.S. PATENT DOCUMENTS

| | | | | |
|---|---|---|---|---|
| 8,417,954 | B1* | 4/2013 | Sagal | G06F 21/64 |
| | | | | 713/176 |
| 2007/0067634 | A1* | 3/2007 | Siegler | G06Q 20/3823 |
| | | | | 713/172 |
| 2011/0145584 | A1* | 6/2011 | Coburn | H04L 63/0464 |
| | | | | 713/176 |
| 2012/0066493 | A1* | 3/2012 | Widergren | H04L 63/0428 |
| | | | | 713/160 |
| 2013/0080573 | A1* | 3/2013 | Boliek | H04L 63/08 |
| | | | | 709/217 |
| 2021/0406372 | A1* | 12/2021 | Albero | G06F 21/564 |
| 2023/0353384 | A1* | 11/2023 | Bruso | H04L 9/3247 |

FOREIGN PATENT DOCUMENTS

| | | | | |
|---|---|---|---|---|
| CA | 2638442 | A1 * | 1/2010 | H04L 51/00 |
| EP | 1481522 | B1 * | 3/2007 | H04L 63/126 |
| GB | 2631433 | A   * | 1/2025 | H04L 9/3297 |
| WO | WO-2015161682 | A1 * | 10/2015 | H04L 9/40 |
| WO | WO-2022243707 | A1 * | 11/2022 | G06F 21/6263 |

* cited by examiner

*Primary Examiner* — Sakinah White Taylor
(74) *Attorney, Agent, or Firm* — Shook, Hardy & Bacon (57) ABSTRACT

A processor-based method for securing files through a persistent signature includes selecting file contents; selecting a file header associated with the file contents; selecting a private key, a certificate identifier and a hash algorithm identifier; creating an encrypted hash of the file contents and file header using the hash algorithm and private key; and creating a persistent, independent signature for the file contents and file header that identifies the certificate identifier, hash algorithm identifier, and the encrypted hash value.

18 Claims, 10 Drawing Sheets

SYSTEM AND METHOD FOR FILE INTEGRITY WITH FILE-BASED ATTRIBUTES

FIELD OF THE DISCLOSURE

The present invention provides a mechanism to create a signature for individual files through methods applicable for all file types and using file-based attributes for storing information about the file.

BACKGROUND

The integrity of the supply chain from software vendors to users of their software is vital to computer and software security. A popular method for increasing security and validating for a software file includes creating a signature for the program and providing the user with a certificate that includes a mechanism for validating the signature. The signature is associated with the software file at the time it is created. The certificate is provided to the user via a public mechanism, including having the user download the certificate from the vendor's web site.

This mechanism works well for software files that can be executed on the user's system. However, the software created by the vendor often includes configuration files, scripts, descriptive text files, an installation video and other files, some of which are human-readable and others of which are encoded in a non-human-readable structured from, such as an audio or video file. Currently, there is not a mechanism to create signatures for these other and varied types of files. Therefore, improvements are desirable.

SUMMARY

Software often includes not only executable files but also configuration files, scripts, descriptive text files, installation video, and other files some of which are human-readable, and others of which are encoded in a non-human-readable form, such as audio or video files. The present invention provides a mechanism to create verifiable signatures for files of mixed types. The disclosed systems and methods can individually sign all file types, including text files, configuration files, and media files, including those files that can be executed and those that direct the execution.

In one aspect of the present invention, a processor-based method for securing files through a persistent signature includes selecting file contents; selecting a file header associated with the file contents; selecting a private key, a certificate identifier and a hash algorithm identifier; creating an encrypted hash of the file contents and file header using the hash algorithm and private key; and creating a persistent, independent signature for the file contents and file header that identifies the certificate identifier, hash algorithm identifier, and the encrypted hash value.

In another aspect of the present invention, a computer program product, includes a non-transitory computer readable medium comprising instructions which, when executed by a processor of a computing system, cause the processor to perform the steps of selecting file contents; selecting a file header associated with the file contents; selecting a private key, a certificate identifier and a hash algorithm identifier; creating an encrypted hash of the file contents and file header using the hash algorithm and private key; and creating a persistent, independent signature for the file contents and file header that identifies the certificate identifier, hash algorithm identifier, and the encrypted hash value.

In another aspect of the present invention, a method of verifying a file includes selecting a file and header; extracting a signature; retrieving a public key associated with the signature; decrypting an encrypted hash to get a clear text value; creating a new hash value; and determining if the clear text value matches the new hash value and if a matched is detected, verifying the signature, and if a match is not detected failing the verification.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

In general, the present invention discloses techniques for creating a digital signature for a file. The creator or originator of the digital signature selects file contents and a file header to create a digital signature for a file, using a private key, certificate identifier and a hash algorithm identifier. The digital signature is stored in the file footer.

Figure 1:
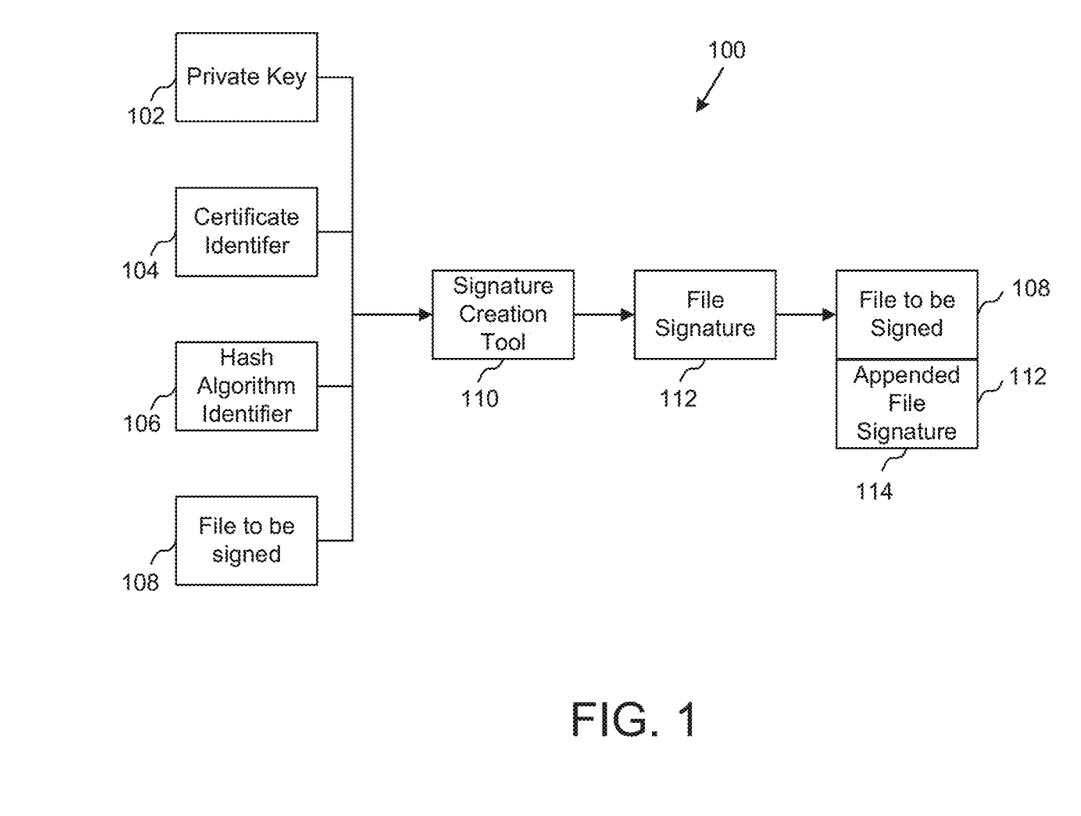
FIG. 1 is a schematic figure of a system for creating a verifiable file signature.

FIG. 1 is a schematic diagram of a general process for signing a file 108 with a signature 112. A signature creation tool 110 applies a hash algorithm to the file 108 to be signed to create a hash value that can be used to detect when and if the file to be signed 108 has any alterations to its content. A hash algorithm identifier 106 identifies which hash technique was used to create the hash value. The signature creation tool 110 encrypts the hash value using the private key 102. The encrypted hash value and the certificate identifier 104 are combined to form the file signature 112. The file signature 112 is appended to the file 108, resulting in a signed file 114. The certificate identifier 104 can be used to identify a certificate that a user or installer can use to verify the signed file 114. The certificate contains the public key corresponding to the private key used to encrypt the hash value. The certificate may also have other attributes such as start and end dates for validity.

Figure 2:
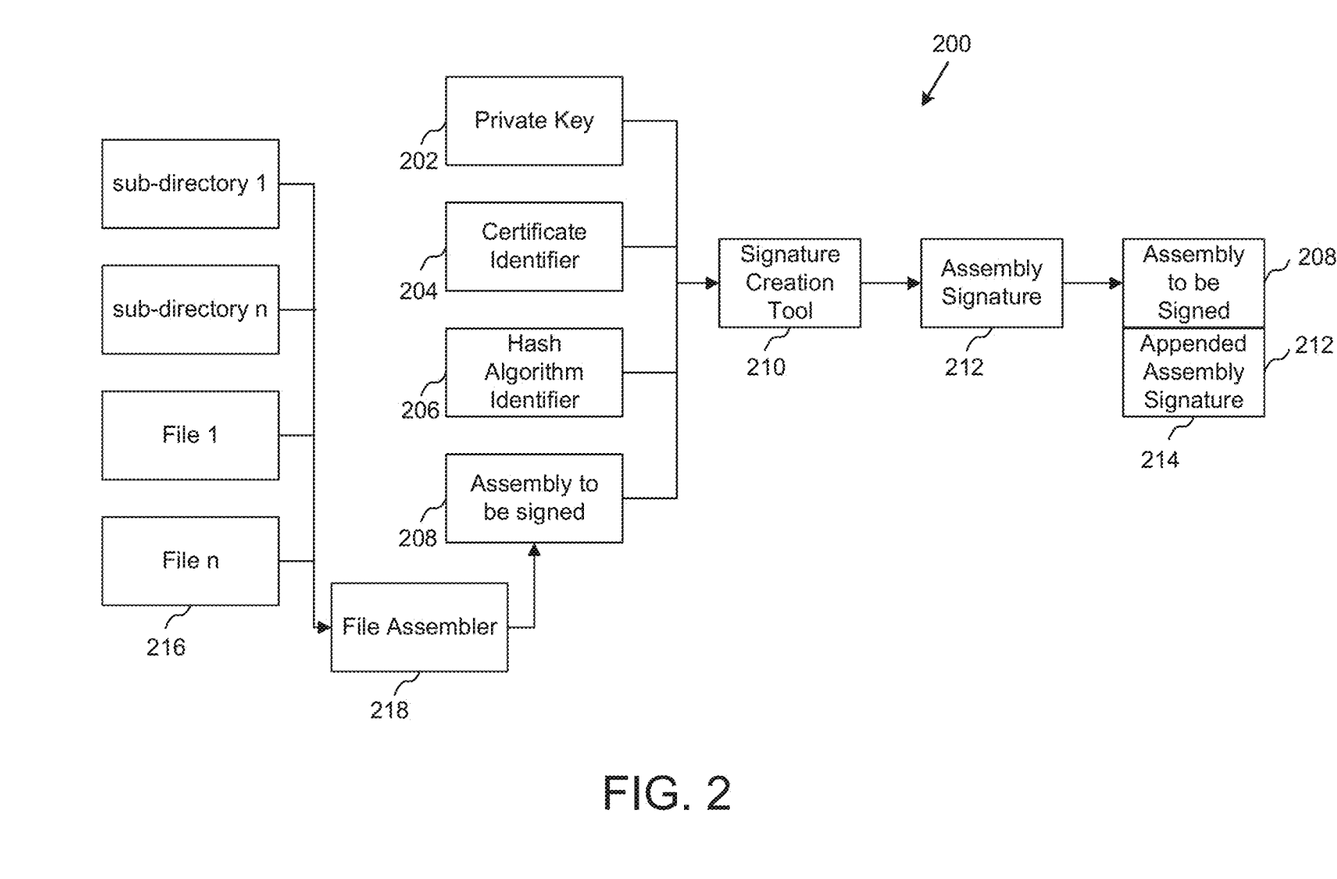
FIG. 2 is a schematic figure of a system for creating a verifiable signature for an assembly of files.

FIG. 2 shows a schematic diagram of a system for signing a set of files 216 (File 1 . . . . File n) and subdirectories (Sub 1 . . . . Sub n) using a file assembler 218 to create an assembly 208. The assembly 208 may be a "zip" file, a "cab" file, a "tar" file, or similar assembly of multiple files. A signature creation tool 210 uses a private key 202, a certificate identifier 204, and a hash algorithm identifier 206, as described above, to create a signed assembly 214 with appended assembly signature 212.

The present disclosure applies to files maintained in any file system. The present disclosure is useful when the originator wishes to sign non-executable files and non-assembled files, for example, configuration text files, read.me text files, structured files such as MP3 audio files for MP4 video files and other types of files for which no signing process currently exists. And, if the originator wishes to sign directories that instantiated as files in the file system. The originator may also wish to create a unique signature for each file in a directory, regardless of the file type or its contents. Also, the originator may wish to differentiate among the various kinds or purposes of the files, for example, files that can be executed, files that contain configuration information, files that are documentation or "read.me" files and where the originator wishes to create a separate signature for each file or for each kind or purpose of file.

For the present disclosure, files of any type, directories and assemblies of files and directories are examples that may be verifiably secured by the present invention's systems and methods employing persistent independent signatures. The disclosed system and methods allow for benefits in any hierarchical file system or flat file system. Examples of types of files included, are non-executable files and non-assembled files, configuration text files, read.me text files, structured files such as MP3 audio files or MP4 video files, and other types of files for which no signing process previously exists.

For the present disclosure, an originator refers to the person or organization who acts on or processes the original set of files or directories and uses procedures and tooling described herein to create the signature for the set of files. An installer refers to the person or organization who receives the signed files and performs the process to validate its contents. The installer may modify configure files or other files in the signed files. The installer may also create additional files to add to the signed files. If the installer modifies any of the contents of a signed file, the file can be re-signed using the procedures and mechanisms herein. A user is a person or organization who causes the software to initiate execution.

Within the operating system, there is a file header that contains meta data about the file. This metadata includes the file name, a timestamp of when the file was created, who created the file, security attributes and so on. This concept of a file header is common across many operating systems. In commodity operating systems, the signing of a code file puts the information about its signing either in the file itself (by appending data) or in linked system objects (access control list, etc.). This puts them at risk for corruption or hacking, and they are defined for only certain file types (i.e. executables).

The present invention adds the attributes necessary for signing of the file in a file footer, which is not part of the file's data, but part of the meta data controlled by the operating system. The users can inquire on various attributes of the signing or if they have access or privilege, change those attributes. The result of the present invention is to create signatures for all files, independent of contents, and provide a mechanism for signing and resigning files.

Figure 3:
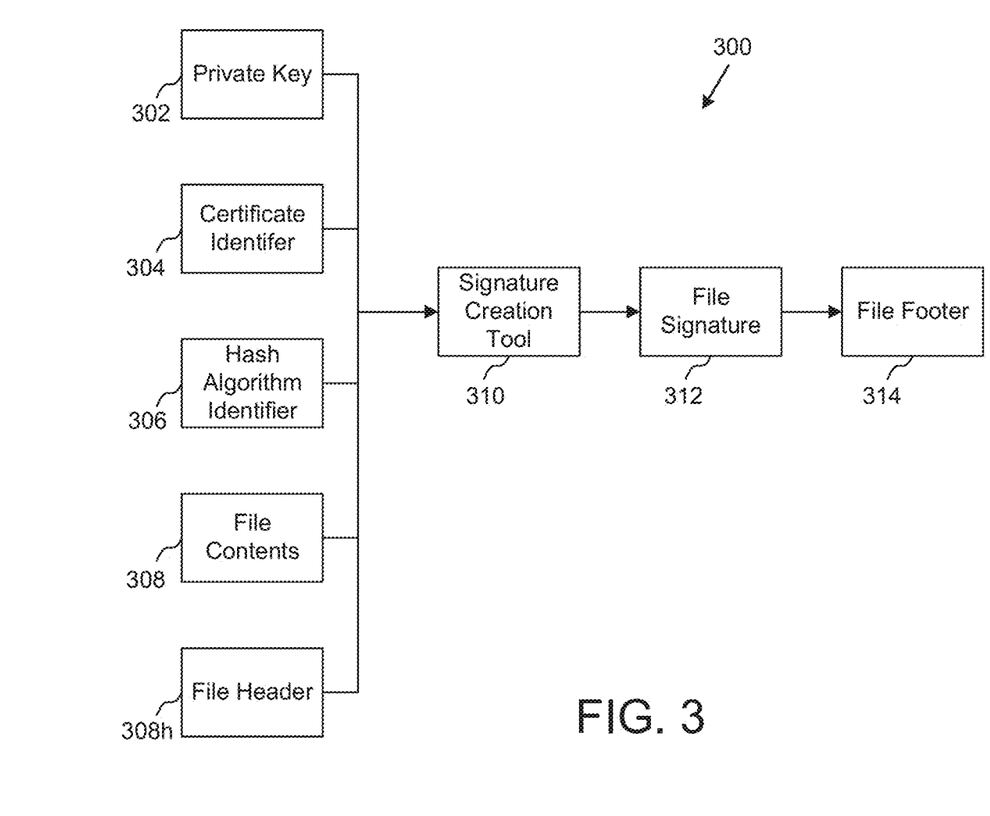
FIG. 3 is a schematic figure of a system for creating a verifiable file signature, according to an example embodiment of the present invention.

Referring to FIG. 3, a file includes a file header 308h and file contents 308 that can be read and written by users. The file header 308h is the meta data associated with the file that is under control of the operating system. The file header 308h, file contents 308, private key 302, certificate identifier 304 and hash algorithm identifier 306 are used by the signature creation tool 310 to create a file signature 312. This information and other meta data is stored in the file footer 314 (meta data associated with the file that is also under control of the operating system). The file footer 314 is meta data similar to the file header 308h, but it contains the file signature 312 and any other meta data that is required to validate the file signature 312. The file signature 312 covers the file header 308h and the file contents 308. The file signature 312 is the digital checksum of the file 308 and its file header 308h.

Figure 4:
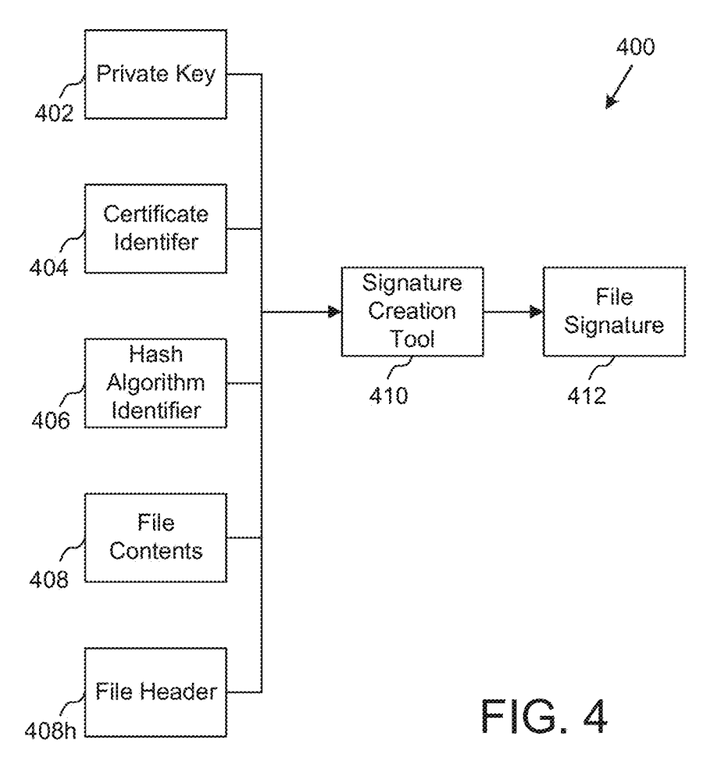
FIG. 4 is a schematic figure of a system for creating a verifiable file signature, according to an example embodiment of the present invention.

Referring to FIG. 4, the file signature 412 is an independent, persisted object. The originator can choose a different private key 402, associated certificate identifier 404, and/or hash algorithm 406 for each file 408 and file header 408h to be signed. The signature creation tool 410 uses these inputs to create the file signature 412.

Figure 6:
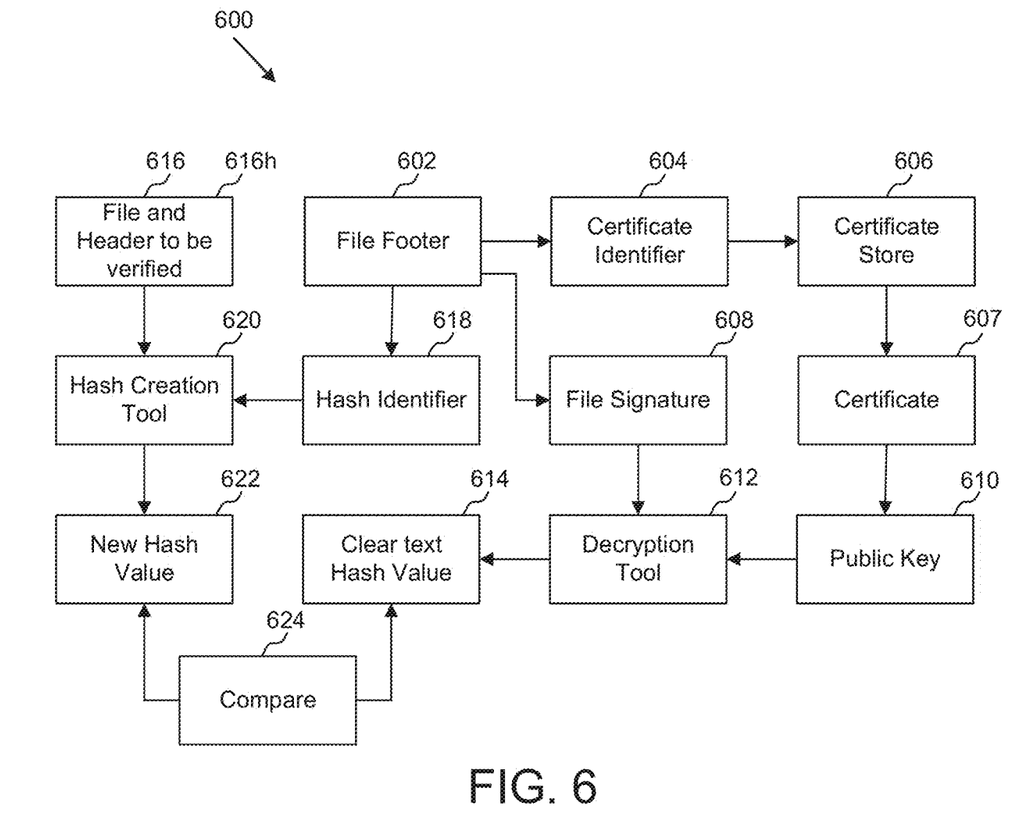
FIG. 6 is a schematic figure of a process for verifying a file using a signature, according to an example embodiment of the present invention.

The originator may wish to differentiate among the various kinds or purposes of the files, for example, files that can be executed, files that contain configuration information, and files that are documentation or "read.me" files. In this situation, the originator may choose a specific private key 402 and associated certificate identifier 404 pair and hash algorithm identifier 406 for each identified kind or purpose of the file. The certificate identifier 404 must uniquely identify a certificate, shown in FIG. 6 as 607, in the user's certificate store, shown in FIG. 6 as 606. The certificate must be in the user's certificate store when the processing associated with FIG. 6 is performed.

Figure 5:
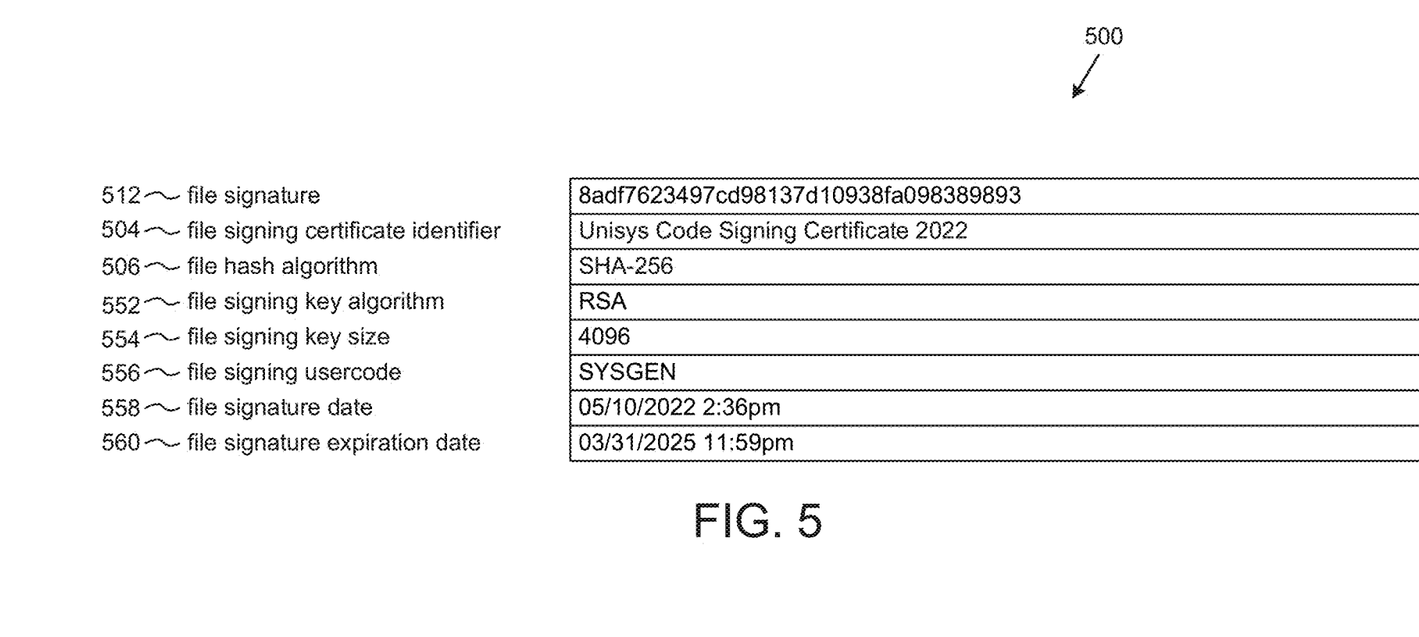
FIG. 5 is a schematic figure of example content included in an independent signature for a file, according to an example embodiment of the present invention.

Referring to FIG. 5, a sample structure and content of a file footer 500 is illustrated according to one embodiment. The file signature 512 identifier is saved from the above-described process along with the file signing certificate identifier 504 and file hash algorithm 506. Additional metadata is also kept from the above process for later examination, including the file signing key algorithm 552 and the file signing key size 554 (which are present in the signing certificate pointed to by the certificate identifier 504). Other meta-data is saved from the file signing process for auditing, including the user code that performed the file signing 556 and the date when the file signing occurred 558.

The expiration date 560 is also saved in the file footer 500. In one embodiment, the expiration date 560 is the ValidTo attribute of the file signing certificate (pointed to by 504). In another embodiment, the expiration date 560 may be a policy-based setting depending on regulation or system policy (for example, one year since signing).

Each kind of file system creates and maintains different meta-data about its files. Some meta-data attributes can be created or changed by users, such as the name of the file; name of the directory; read, write or execute restricted access to a file; read or write restricted access to a directory; a list of users, roles or other characteristics who can perform the restricted access to a file or directory (sometimes maintained as an "Access Control List"); whether a file is an executable file or not; and so on. Other file meta-data attributes can only be set or changed by the file system itself, such as timestamps for creation, last reference, last modification, last backup, and other timestamps.

Some file systems set the meta-data attribute to indicate a file is executable at file creation time. Some file systems set the read, write and execute meta-data attributes at file creation or directory creation time. These meta-data attributes typically are either unalterable or can only be changed by the user who created the file or by a privileged user. Some meta-data changes can have significant impacts on a product and its security. For example, changing the executable attribute of a file can make it unusable or can make a previously non-executable file into a malicious executable. Adding a write access meta-data attribute to a file or directory immediately compromises its security. Therefore, the file signature contains both the file contents and the file header (but not the file footer) to stop security attacks from compromising security. In the present invention, the file footer contains the file signature as opposed to the signature being appended to a file.

An installer uses the signature to verify the contents of a file and performs the process described in FIG. 6 to validate its contents. Referring to FIG. 6, a system and method 600 for verification of a file's signature is shown schematically. For each file 616 (and file header 616h) to be verified, the file signature 608 is extracted from the file footer 602. The file footer 602 also contains the associated certificate identifier 604 used to retrieve the certificate 607 from the certificate store 606. Certificates 607 are trusted bindings of public key 610 to identity the signed file. The certificate store 606 is a list of trusted signers that can verify that a user's certificate 607 is valid and identify the public key 610 paired with the private key.

The decryption tool 612 uses the file signature 608 and the public key 610 to recover the clear text hash value 614 for the file 616 (and file header 616h) to be verified. The file footer 602 also includes the hash identifier 618, used by the hash creation tool 620 to recalculate the hash value for the file to be verified 616, creating the file's new hash value 622. At 624, the new hash value 622 is compared to the clear text hash value 614. If the file's new hash value 622 matches the clear text hash value 614, the file to be verified 616 and the file header 616h have not been modified since it was originally signed and the verification succeeds. Otherwise, the verification fails.

The validity of the file signature 608 as indicated by the signature expiration data kept in the file footer 602 must be validated before using the file signature 608. The current data and time may be after the expiration date specified in the file footer's signature expiration date. In that case, verification fails, otherwise, the validation succeeds.

The validity of the certificate 607 indicated by the certificate identifier 604 must be checked prior to using its public key 610. The certificate 607 may not be found in the certificate store 606 in which case the verification fails. The certificate 607 may have expired, may have been revoked, may have been superseded by another certificate, or otherwise been rendered invalid. The validity of the file signature 608 must be checked prior to using it by the decryption tool 612.

Using the above techniques, the originator chooses files to be signed with a specified certificate and hash algorithm. The originator uses the techniques described in FIG. 3 to create signatures 312 and file footers 314. The result of the originator's actions is a signed file 312 and the file footer 314 meta-data to include with the file. The installer uses the system and methods of FIG. 6 to ensure the validity of the file signature 310 of FIG. 3 (corresponding to file signature 608). The installer chooses the items to be verified.

In some cases, the installer modifies one or more files in the selected directory, for example, a configuration file. After modifying the file, the installer performs the originator actions and uses the techniques of FIG. 3 to create a new signature for each modified file. The installer may use a private key, certificate identifier and hash algorithm identifier different from those used by the originator and update the file footer accordingly. The processes described in FIG. 3 replace the prior signatures for the modified files with new signatures. The signatures for any unmodified files and directories remain as they were when created by the originator.

The user uses the system and methods of FIG. 6 to ensure the validity of the signed file as well as that the file signature has not expired. Any changes made by the installer and re-signed by the installer are verified during this process. The user may resign the file with a key that they have access to or that is designated for this function. The user may also reject any files resigned by the installer. These resigned files would indicate the installer changed the file since the originator signed the file. Depending on the trust level between entities, the user could accept the installer modified files or reject them in favor of the original signed files from the originator. This is part of the verification process and ensures security.

Figure 7:
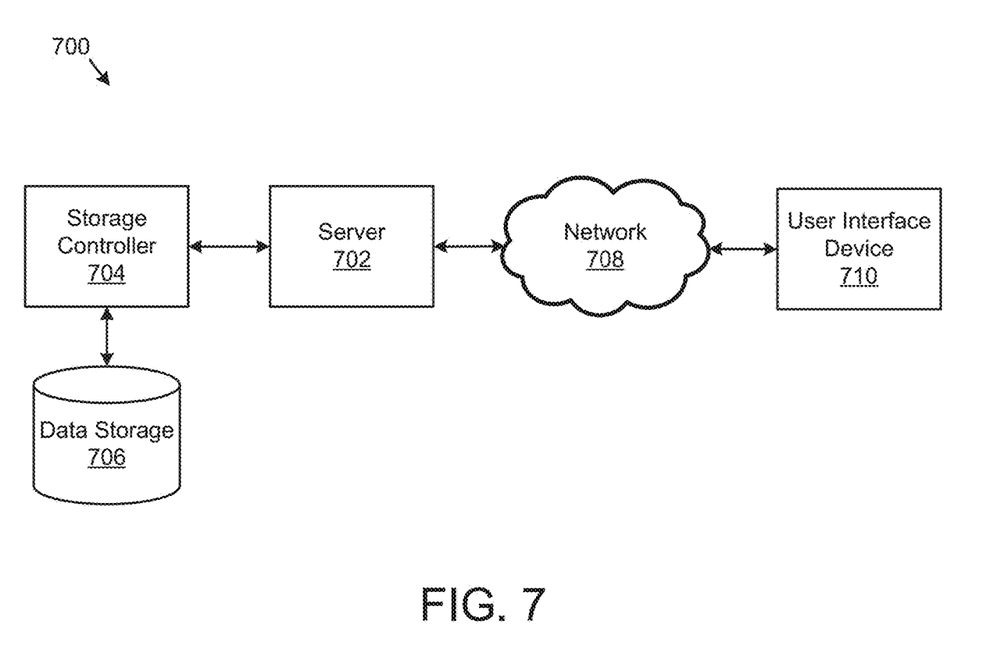
FIG. 7 is a block diagram illustrating a computer network.

FIG. 7 illustrates a computer network 700 for obtaining access to software, directories, files, meta-data, and assemblies of files in a computing system according to one embodiment of the disclosure. The system 700 may include a server 702, a data storage device 706, a network 708, and a user interface device 710. The server 702 may also be a hypervisor-based system executing one or more guest partitions hosting operating systems with modules having server configuration information. In a further embodiment, the system 700 may include a storage controller 704, or a storage server configured to manage data communications between the data storage device 706 and the server 702 or other components in communication with the network 708. In an alternative embodiment, the storage controller 704 may be coupled to the network 708. In another embodiment, the network 700 may utilize virtual hardware and virtual machines which put a server 702, a data storage device 706, and a user interface device 710 on the internet ("the cloud") and which may be expanded based on need.

In one embodiment, the user interface device 710 is referred to broadly and is intended to encompass a suitable processor-based device such as a desktop computer, a laptop computer, a personal digital assistant (PDA) or tablet computer, a smartphone or other mobile communication device having access to the network 708. In a further embodiment, the user interface device 710 may access the Internet or other wide area or local area network to access a web application or web service hosted by the server 702 and may provide a user interface for enabling a user to enter or receive information.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 8:
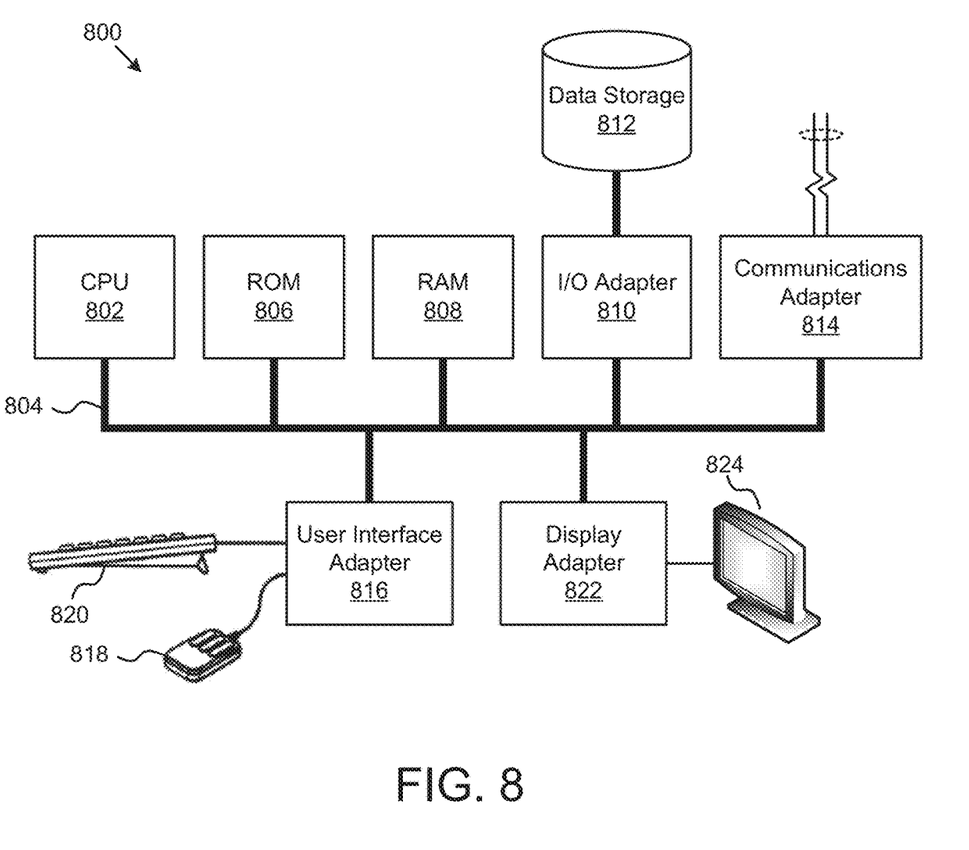
FIG. 8 is a block diagram illustrating a computer system.

FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 may also include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an I/O adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The user interface adapter 816 couples user input devices, such as a keyboard 820, a pointing device 818, and/or a touch screen (not shown) to the computer system 800. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of the server 702 and/or the user interface device 810. For example, any suitable processor-based device may be utilized including, without limitation, IoT devices, tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, solid-state storage, flash memory, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Generally, solid-state storage use electronic circuits to reproduce data, including flash memory. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 9:
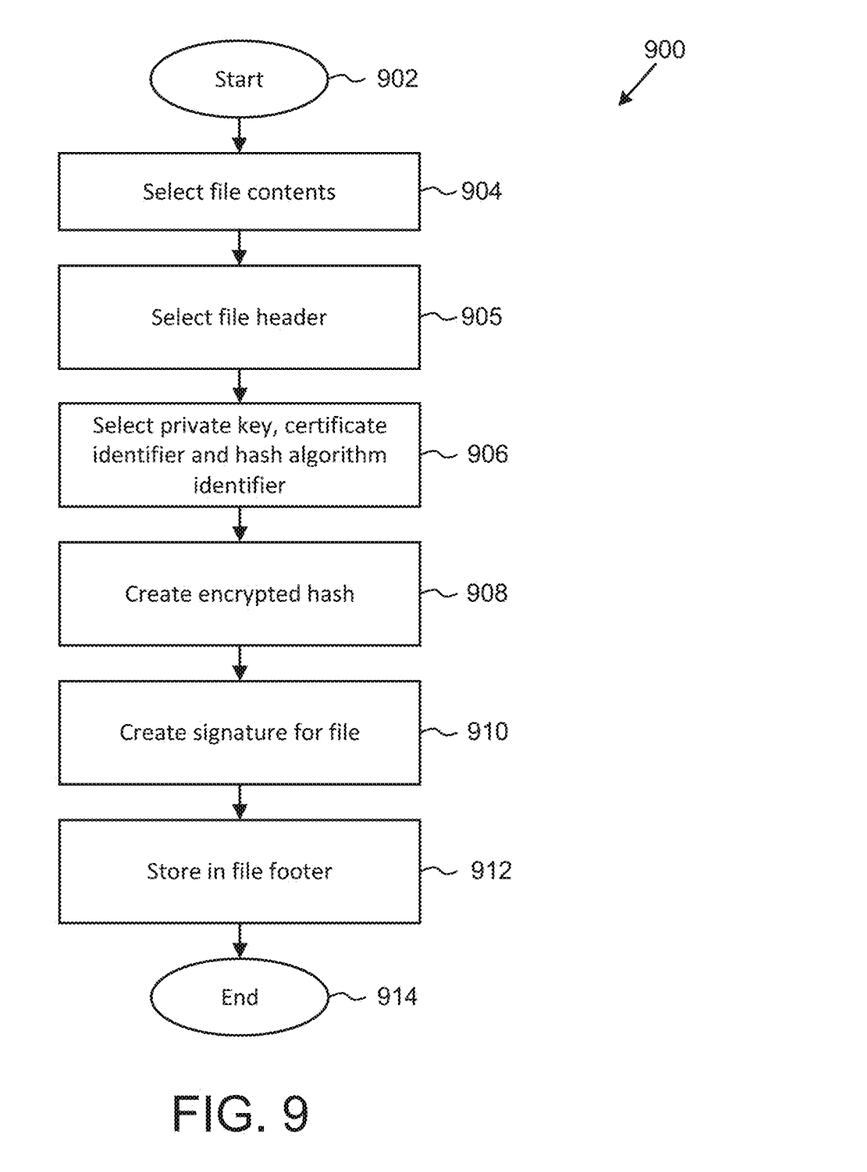
FIG. 9 is a flow diagram of a method for securing files through a persistent signature, according to an example embodiment of the present invention.

FIG. 9 is a flow diagram of a method 900 for securing files through a persistent signature. The method 900 starts at 902. At 904, file contents of any type are selected. The file type could be an executable file or another file type such as configuration files, scripts, MP3, MP4, or descriptive text files. Whether the file type is human-readable or encoded in a non-human readable structured form does not matter as the method 900 can be used with either type. At 905, the file header is selected. At 906, a private key, certificate identifier and a hash algorithm identifier are selected for the file (including the file contents and the file header). At 908, an encrypted hash of the file selected is created with the hash algorithm and private key selected for the file at 906.

The private key has a unique public key paired to it that can be identified with the certificate identifier selected at 906. At 910, a persistent, independent signature for each selected file that identifies the file, certificate identifier, hash identifier and the encrypted hash value for the file is created. At 912, the signature and other meta data is stored in the file footer. The method 900 ends at 914. The signature may be displayed or accessed and processed as human-readable or machine-readable text and numerals. The signature may be created so that files with similar qualities share characteristics, such as sharing the same private key. Software originators and vendors can apply a signature created with method 900 to any file type and may group files for related applications or keep every file uniquely signed.

Figure 10:
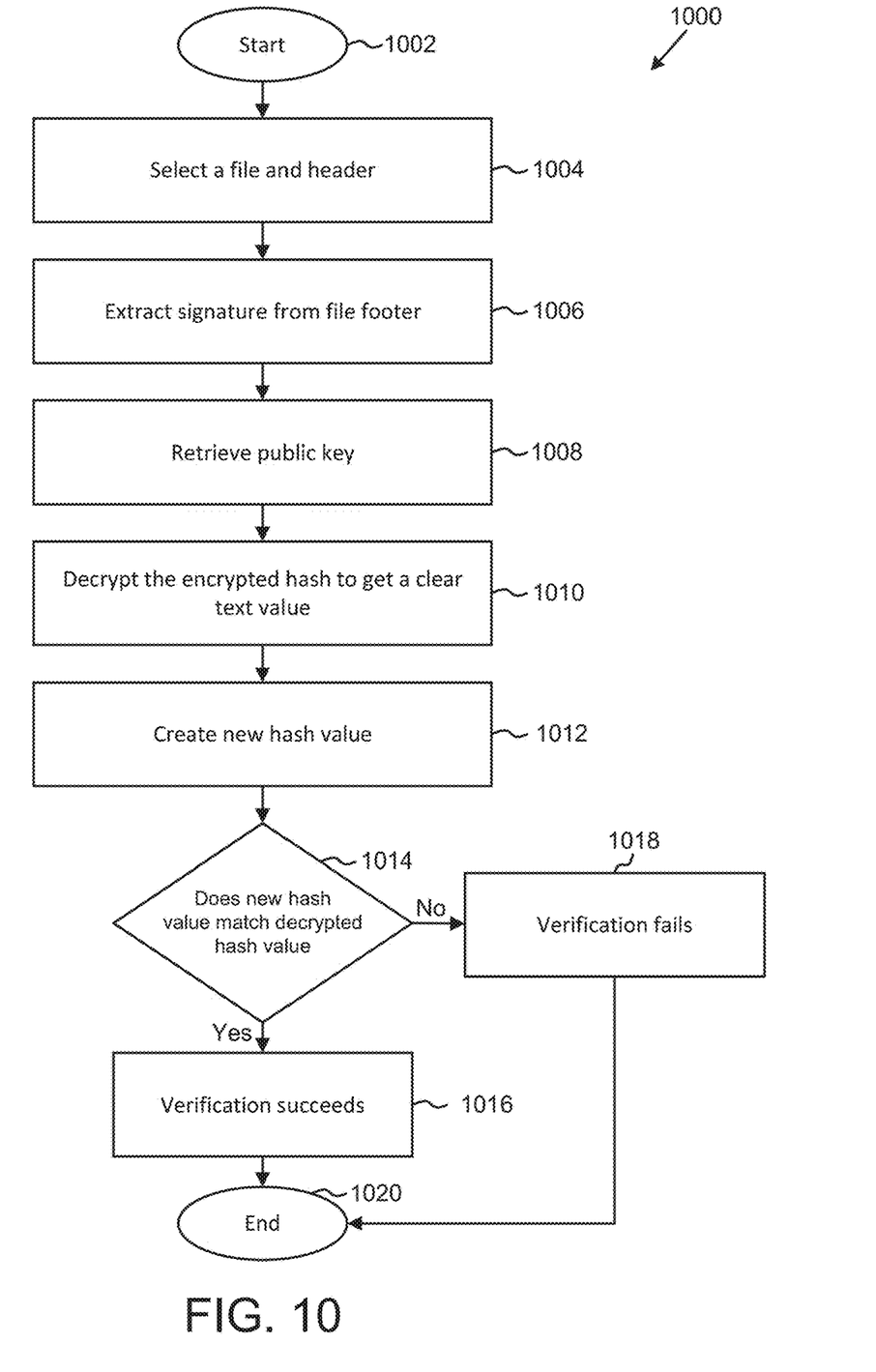
FIG. 10 is a flow diagram of a method for verifying a file with a persistent signature, according to an example embodiment of the present invention.

FIG. 10 is a method 1000 for verifying a secured file, directory, or meta-data. The method 1000 starts at 1002. At 1004 a file and file header is selected to process with method 1000. At 1006 a persistent, independent signature for the selected file and file header is obtained or extracted from a file footer. The signature includes a certificate identifier and at 1008 is used to retrieve a certificate, for example from a user's certificate store, and obtain a public key. The signature also includes the encrypted hash value for the file and file header and at 1010 this encrypted hash value is decrypted using the public key and a decryption tool, creating a clear text hash value from the signature. Next, at 1012 the signature's hash identifier and a hash creation tool are used to create a new hash value for the file and file header. Then, at 1014 the decrypted hash value from 1010 is compared with the new hash value created at 1012. A decision is made at 1014 by comparing if the hash values match. If the file's new hash value matches the clear text hash value, then it can be confirmed that the file and file header to be verified has not been modified since it was originally signed, and the verification succeeds at 1016. If the new hash value does not match the clear text hash value, then the verification fails at 1018. The method 1000 ends at 1020.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A processor-based method for securing files through a persistent signature, comprising:
    selecting file contents;
    selecting a file header associated with the file contents, wherein the file contents and the file header comprise a file of any type;
    selecting a private key, a certificate identifier and a hash algorithm identifier, wherein the private key is based on an identified type or purpose of the file;
    creating an encrypted hash of the file contents and file header using the hash algorithm and private key; and
    creating a persistent, independent signature for the file contents and file header that identifies the certificate identifier, hash algorithm identifier, and the encrypted hash value.

2. The method of claim 1, further comprising storing the signature in a file footer.

3. The method of claim 1, wherein the file is an executable file.

4. The method of claim 3, further comprising selecting a second file contents and second header comprising a second file of a different type.

5. The method of claim 1, wherein the file of any type includes selecting one or more files of one or more file types, and wherein creating a persistent, independent signature creates one signature for all selected files of a shared file type.

6. The method of claim 1, wherein one private key, certificate identifier, and hash algorithm identifier are selected for more than one file.

7. The method of claim 1, wherein one private key, certificate identifier, and hash algorithm identifier are selected for one or more files of a shared file type.

8. The method of claim 1, wherein the file is a text file.

9. The method of claim 1, wherein the file is a configuration file.

10. The method of claim 1, wherein the file is an audio or video file.

11. A computer program product, comprising:
    a non-transitory computer readable medium comprising instructions which, when executed by a processor of a computing system, cause the processor to perform the steps of:
    selecting file contents;
    selecting a file header associated with the file contents, wherein the file contents and the file header comprise a file of any type;
    selecting a private key, a certificate identifier and a hash algorithm identifier, wherein the private key is based on an identified type or purpose of the file;
    creating an encrypted hash of the file contents and file header using the hash algorithm and private key; and
    creating a persistent, independent signature for the file contents and file header that identifies the certificate identifier, hash algorithm identifier, and the encrypted hash value.

12. The computer program product of claim 11, further comprising storing the signature in a file footer.

13. The computer program product of claim 11, wherein the file is an executable file.

14. The computer program product of claim 13, further comprising selecting a second file contents and second header comprising a second file of a different type.

15. The computer program product of claim 11, wherein the file of any type includes selecting one or more files of one or more file types, and wherein creating a persistent, independent signature creates one signature for all selected files of a shared file type.

16. The computer program product of claim 11, wherein one private key, certificate identifier, and hash algorithm identifier are selected for more than one file.

17. The computer program product of claim 11, wherein one private key, certificate identifier, and hash algorithm identifier are selected for one or more files of a shared file type.

18. The computer program product of claim 11, wherein the file is a configuration file.

* * * * *